United States Patent Office 3,347,820
Patented Oct. 17, 1967

3,347,820
THERMALLY STABILIZED HALOGENATED POLYOLEFIN COMPOSITIONS
Leo S. Chang, Florham Park, Edith Turi, Livingston County, and Neil A. Lindo, New Providence, N.J., assignors to Allied Chemical Corporation, New York, N.Y., a corporation of New York
No Drawing. Filed Mar. 19, 1964, Ser. No. 353,248
7 Claims. (Cl. 260—45.8)

ABSTRACT OF THE DISCLOSURE

This invention relates to the stabilization of chlorinated polyethylene against the harmful effects of high temperatures by the addition thereto of a di-(4-oxyphenyl) derivative of p-tolyl ether.

---

It is known that halogen-containing polyolefins such as polyvinylchloride, chlorinated polyethylene and chlorinated polypropylene are adversely affected when exposed to elevated temperatures either during fabrication or during use. This adverse effect is usually evidenced by a darkening in color and an increase in viscosity which is demonstrated by the increased work required to extrude or mix the material. It is generally believed that this change is viscosity is due to splitting hydrogen and/or chlorine atoms out of the polymer molecule resulting in increased crosslinking of the polymer.

Many additives have been proposed which increase the thermal stability of specific halogen-containing polyolefins. However, there is no consistency in and predictability of the effectiveness of these stabilizers when used in different types of halogen-containing polyolefins. For instance, a number of compounds which effectively stabilize vinyl chloride compounds against thermal effects, have little or no stabilizing effect on chlorinated polyethylene. Another factor to be considered in the selection of a thermal stabilizer is the presence of a metal constituent in many of the prior art additives. These metal-containing stabilizers, such as metal salts, metal phenolates and organometallic compounds, are frequently incompatible with the polymer, causing loss of transparency, discoloration and nonhomogeneous appearance.

It is an object of the present invention to provide heat stable compositions based upon chlorinated polyethylenes.

Another object of the present invention is to provide metal-free organic stabilizers for and compatible with chlorinated polyethylenes.

Additional objects and advantages of the present invention will become apparent from the following detailed description thereof.

In accordance with the present invention the thermal stability of chlorinated ethylene polymers is improved by the addition thereto of a di-(4-oxyphenyl) derivative of p-tolyl ether. The stabilizing additives of the invention can be represented by the formula:

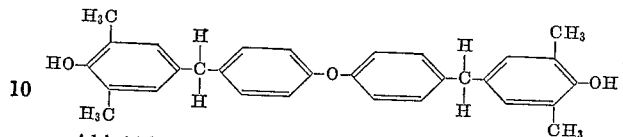

where each R is independently an alkyl substituent, x is a number from 0 to 2 inclusive with any unspecified valences being satisfied by hydrogen, and each Y is independently a substituent of the group consisting of hydrogen and alkylene oxide. Illustrative of the stabilizing additives of the present invention are α,α'-bis(3,5-dimethyl-4-hydroxyphenyl)-p-tolyl ether, a novel compound:

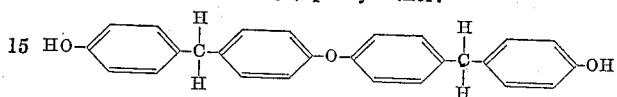

α,α'-bis(4-hydroxyphenyl)-p-tolyl ether:

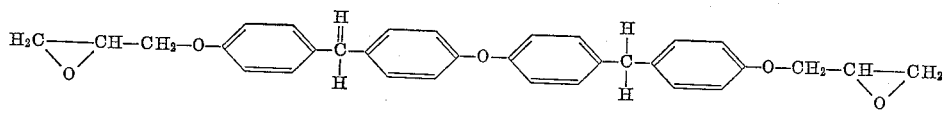

diglycidyl ether of α,α'-bis(4-hydroxyphenyl)-p-tolyl ether:

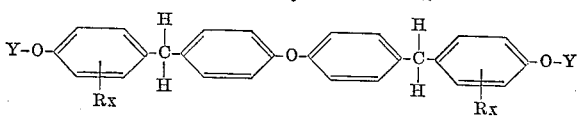

These stabilizers are effective when added to chlorinated polyethylene in amounts equal to at least about 0.5 percent by weight of the polymer, with optimum results being obtained when the stabilizers are added in amounts equal to about 1 to 10 percent by weight of the polymer.

The derivatives of p-tolyl ether, according to the invention, can be prepared by reacting α,α'-dichlorotolyl ether with phenol or a substituted phenol. For instance, the new compound, α,α'-bis(3,5-dimethyl-4-hydroxyphenyl)-p-tolyl ether can be made by reactng 2,6-dimethylphenol with α,α'-dichloro-p-tolyl ether. The etherified derivatives of the bisphenol compounds can be prepared by known etherification procedures. For instance, the bisphenol compounds can be reacted with epichlorohydrin to form diglycidyl ethers, etc.

The stabilizers can be employed with other common additives used in halogenated polyolefin formulations, such as stabilizers against the effect of radiation, fillers, pigments, and dyes. The stabilizer can be incorporated into the polymer formulation by any known blending technique.

The effectiveness of these stabilizers can be measured by determination of the extent of crosslinking which is occasioned in the polymer by exposure to elevated temperatures. This crosslinking can be measured by the amount of gel formation. The latter can be determined as the percentage of the polymer, originally entirely soluble in monochlorobenzene, which is no longer soluble in monochlorobenzene after the heat treatment. Gel formation increases viscosity and slows the rate of extrusion of the polymer if extrusion is carried out at a constant pressure on the polymer.

A further measure of effectiveness of stabilization is the comparison of color of the unstabilized material with that of the stabilized material after both have been exposed to elevated temperatures.

The chlorinated polyethylene stabilized by our invention can contain from about 20 to about 80% by weight chlorine. In a preferred embodiment, the chlorinated polyethylene is randomly chlorinated whereby it is essentially amorphous and has a low brittle point (glass transition temperature), such as about 0° C. or lower at 20 percent chlorine content and rising with chlorine content to over 185° C. at 80 percent chlorine content. Particularly suitable polyethylenes to be chlorinated for use in our invention are those produced as described in Example 6 of British Patent No. 858,674, of Jan. 11, 1961. Such polyethylenes can be chlorinated with advantage for use in our invention by the process described in Example 3 of French Patent No. 1,316,044 of Dec. 17, 1962.

The polymerization process of British Patent No. 858,674 results generally in a polymer of high molecular weight such as 500,000 to 5,000,000 average molecular weight, and of density of about 0.935 to 0.96 gm./cm.$^3$ at 25° C. The molecular weight of the polymer can be reduced by a thermal treatment, for instance in accordance with the process outlined at page 12, lines 73–77 of the above identified British Patent No. 858,674. The molecular weight of the resulting polyethylenes will be in the range of about 20,000 to 300,000, and the density will be about 0.94–0.985 gm./cm.$^3$ at 25° C.

The foregoing molecular weights are calculated from the intrinsic viscosity of a solution of the polymer in decalin, according to the method of P. S. Francis et al. (Journal of Polymer Science, volume 31, pp. 453–466), i.e. by using the following formula:

$$[\eta] = 6.77 \times 10^{-4} \times M^{0.67}$$

where $[\eta]$ is the intrinsic viscosity in deciliters per gram, and M is the average molecular weight.

When polyethylenes of molecular weights such as 100,000 and below are chlorinated for use in our invention, solution chlorination methods can be used to advantage to obtain the desired amorphous products.

The glass transition temperatures above cited can be determined by a standard test for stiffness (ASTM test D–1043–61T), as the temperature below which the stiffness sharply increases so that the sample becomes brittle. A typical stiffness modulus at the glass transition temperature for the subject chlorinated polyethylenes is $1.45 \times 10^4$ p.s.i. (i.e. $10^9$ dynes/cm.$^2$).

One preferred group of randomly chlorinated polyethylenes of chlorine content in the range 20–80 percent by weight used in our invention, will have relatively high intrinsic viscosities from about 1.5 to about 5 deciliters per gram, indicating high molecular weight. Other useful and preferred chlorinated polyethylenes, not necessarily amorphous, will have intrinsic viscosities from about 0.1 to about 1.5 deciliters per gram, indicating lower molecular weight of the polymer. These intrinsic viscosities are determined upon a 0.1 gram per 100 ml. solution in o-dichlorobenzene at 100° C.

The following examples describe completely specific embodiments of our invention and illustrate the best mode contemplated by us of carrying out our invention; but are not to be interpreted as limiting the invention to all details of the examples.

The samples tested consisted of unstabilized controls and compositions containing stabilizer in an amount equal to 4% by weight of the weight of the chlorinated polyethylene. In all tests the chlorinated polyethylene sample was ground to about –40 mesh powder. The stabilizer was dissolved in a volatile solvent, such as methanol. This solution was added to the powdered polymer and the mixture was stirred under $N_2$ at ambient temperatures, until completely dried.

About 2–3 grams of each prepared sample were heated in open test tubes in a block heater at 200° C. for 60 minutes, except where specified otherwise. This heat treatment of the sample resulted in the thermal breakdown of the polymer into a certain percentage of a crosslinked product, or gel; as well as resulting in a discoloration of the polymer, manifested by darkening. The quantitative value of the discoloration was measured using a reflectance meter with a green filter, by comparing the reflectance of the sample to that of a standard white magnesium oxide sample. The reflectance reading obtained on the discolored sample was then expressed as "percent whiteness," the reflectance of the standard being taken at 100% whiteness.

The amount of crosslinked product or gel formed as a result of the heat treatment was determined in accordance with the following procedure.

About 0.2 to 0.3 gram of the heat treated polymer was weighed into a tared stainless steel basket made of 250 mesh screen. This basket was placed into a Soxhlet extractor containing approximately 125 ml. monochlorobenzene, and refluxed for six hours. The non-crosslinked product was extracted, permitting gravimetric determination of the crosslinked gel. During the extraction the system was kept under slow $N_2$ stream to prevent oxidation.

*Example 1–5*

In Table I the results of the comparative tests are shown, made with a high molecular weight chlorinated polyethylene prepared in accordance with Example 6 of British Patent No. 858,674 above cited for the polyethylene, and Example 3 of French Patent No. 1,316,044 above cited for the chlorination; and containing 60.1 percent by weight chlorine and having an intrinsic viscosity of 4.2, and glass transition temperature about 73° C.

TABLE I

| Test | Stabilizer | Percent Whiteness | Percent Gel |
|---|---|---|---|
| Control A | Unstabilized resin | 12 | 34 |
| Ex. 1 | α,α'-Bis(4-hydroxyphenyl)-p-tolyl ether. | 8 | 3 |
| Ex. 2 | α,α'-Bis(3,5-dimethyl-4-hydroxyphenyl)-p-tolyl ether. | 8 | 2 |
| Ex. 3 | Diglycidyl ether of α,α'-bis(4-hydroxyphenyl)-p-tolyl ether. | 16 | 1 |

In Table II the results of other comparative tests are shown, using a reduced molecular weight chlorinated polyethylene containing 67.3 percent by weight chlorine, and having an intrinsic viscosity of 0.7, and essentially random chlorine substitution, with a glass transition temperature of about 150° C. The heat treatments in this example were conducted at 230° C. for 30 minutes.

TABLE II

| Test | Stabilizer | Percent Whiteness | Percent Gel |
|---|---|---|---|
| Control B | Unstabilized resin | 4 | 16 |
| Ex. 5 | Diglycidyl ether of α,α'-bis(4-hydroxyphenyl)-p-tolyl ether. | 4 | 1 |

*Example 6*

A further comparative test was made by measuring the length of time during which the resin remained unchanged while being subject to shear forces in a C. W. Brabender Plastograph at an elevated temperature. The change in stability is shown by a variation in the torque, as recorded by the instrument. This test is a good simulation of actual processing conditions such as are encountered in Banbury mills, rolls, extruders, and the like, and gives an indication of the period of time during which the polymer can be processed. In these dynamic comparative tests 4 grams of stabilizer were incorporated into 100 grams of chlorinated polyethylene containing 68 percent by weight chlorine, with essentially random chlorine substitution, having a glass transition temperature of about 150° C., and having an intrinsic viscosity of 0.7. 16 gram samples of resin containing the stabilizer were worked in the Plastograph at 30 r.p.m. and 220° C. A sample containing the diglycidyl ether of 2,2-bis(4-hydroxyphenyl)-propane, which is a commercially available stabilizer, exhibited a stability time of 3 minutes. In comparison, a resin sample containing the diglycidyl ether of α,α'-bis(4-hydroxyphenyl)-p-tolyl ether, a stabilizer of the invention, exhibited a stability time of 23 minutes.

In Example 7 a process is disclosed for the preparation of the novel compound α,α'-bis(3,5-dimethyl-4-hydroxyphenyl)-p-tolyl ether according to the invention.

*Example 7*

13.2 parts by weight α,α'-dichloro-p-tolyl ether were added to 91.5 parts by weight 2,6-dimethylphenol and the reaction mixture was heated at about 150° C. with stirring for 30 minutes. The excess 2,6-dimethylphenol was then removed by vacuum distillation. The residue was crystallized from toluene and recrystallized from a mixture of acetic acid and water to yield 15.2 parts per weight α,α'-bis(3,5-dimethyl-4-hydroxyphenyl)-p-tolyl ether, having a melting point of 121–124° C.

We claim:

1. A composition comprising a chlorinated polyethylene and a stabilizing compound having the formula:

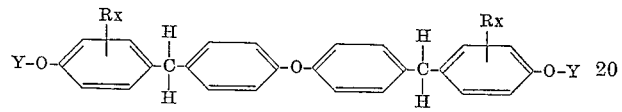

where each R is independently an alkyl substituent, and where $x$ is a number from 0 to 2 inclusive with any unspecified valences being satisfied by hydrogen, and where each Y is independently a substituent of the group consisting of hydrogen and alkylene oxide.

2. The composition of claim 1, wherein said chlorinated polyethylene has a chlorine content between 20 and 80 percent by weight and said dioxyphenyl derivative is present in a concentration of 1–10 percent by weight of the polyethylene.

3. The composition of claim 1, wherein said chlorinated polyethylene contains 20 to 80 percent by weight chlorine, the chlorinated polyethylene being of a high molecular weight with random chlorination and having an intrinsic viscosity in the range between 1.5 and 5 deciliters per gram as measured in o-chlorobenzene at 100° C., and said stabilizing compound is present in a concentration of 1 to 10 percent by weight of said chlorinated polyethylene.

4. The composition of claim 1, wherein said chlorinated polyethylene contains between 20 and 80 percent chlorine and has an intrinsic viscosity between 0.1 and 1.5 deciliters per gram.

5. The composition of claim 1, wherein said stabilizing compound is α,α'-bis(4-hydroxyphenyl)-p-tolyl ether.

6. The composition of claim 1, wherein said stabilizing compound is α,α'-bis(3,5-dimethyl-4-hydroxyphenyl)-p-tolyl ether.

7. The composition of claim 1, wherein said stabilizing compound is the diglycidyl ether of α,α'-mis(4-hydroxyphenyl)-p-tolyl ether.

References Cited

UNITED STATES PATENTS

| | | | |
|---|---|---|---|
| 3,067,165 | 12/1962 | Hudson | 260—45.8 |
| 3,243,394 | 3/1966 | Dietz | 260—45.95 |
| 3,312,657 | 4/1967 | Lund et al. | 260—45.8 |

DONALD E. CZAJA, *Primary Examiner.*

M. J. WELSH, *Assistant Examiner.*

UNITED STATES PATENT OFFICE
CERTIFICATE OF CORRECTION

Patent No. 3,347,820                              October 17, 1967

Leo S. Chang et al.

It is hereby certified that error appears in the above numbered patent requiring correction and that the said Letters Patent should read as corrected below.

Column 1, line 33, for "is", first occurrence, read -- in --; column 2, line 43, for "effect" read -- effects --; column 3, line 74, for "at" read -- as --; column 6, line 6, for "o-chlorobenzene" read -- o-dichlorobenzene --; line 21, for "α,α'-mis" read -- α,α'-bis --.

Signed and sealed this 29th day of October 1968.

(SEAL)
Attest:

Edward M. Fletcher, Jr.                           EDWARD J. BRENNER

Attesting Officer                                        Commissioner of Patents